United States Patent [19]

Nylund et al.

[11] Patent Number: 4,526,745
[45] Date of Patent: Jul. 2, 1985

[54] FUEL ASSEMBLY WITH A WATER FLOW SEPARATED FROM THE FUEL RODS

[75] Inventors: Olov Nylund; Bertil Schölin, both of Västerås, Sweden

[73] Assignee: AB ASEA-Atom, Västerås, Sweden

[21] Appl. No.: 295,985

[22] Filed: Aug. 25, 1981

[51] Int. Cl.³ .............................................. G21C 3/32
[52] U.S. Cl. .................................... 376/444; 376/352
[58] Field of Search ............... 376/352, 362, 364, 365, 376/444, 439, 224, 225, 230, 175, 176, 373, 372, 374, 370

[56] References Cited

U.S. PATENT DOCUMENTS

| | | | |
|---|---|---|---|
| 3,087,881 | 4/1963 | Treshow | 376/372 |
| 3,697,376 | 10/1972 | Mefford et al. | 376/446 X |
| 3,802,995 | 4/1974 | Fritz et al. | 376/435 X |
| 3,873,419 | 3/1975 | Sletten | 376/352 |
| 3,888,732 | 6/1975 | Berglund et al. | 376/352 |
| 4,017,357 | 4/1977 | Patterson, Jr. | 376/352 |

FOREIGN PATENT DOCUMENTS

| | | |
|---|---|---|
| 0027984 | 5/1981 | European Pat. Off. ............ 376/352 |
| 1414844 | 6/1969 | Fed. Rep. of Germany . |
| 1564994 | 1/1970 | Fed. Rep. of Germany . |
| 2746555 | 4/1978 | Fed. Rep. of Germany . |
| 47659 | 8/1966 | German Democratic Rep. . |

Primary Examiner—Richard E. Schafer
Assistant Examiner—Daniel Wasil
Attorney, Agent, or Firm—Pollock, Vande Sande & Priddy

[57] ABSTRACT

A fuel assembly for a boiling water reactor is provided with at least one vertical water channel (4, 5) for a by-pass flow through the fuel assembly. At its lower end the channel is connected to a radial tube (10) which opens out at the outer side surface of the fuel assembly. Below the radial tube, the wall of the assembly base (2) is provided with a through-hole (12).

2 Claims, 4 Drawing Figures

FUEL ASSEMBLY WITH A WATER FLOW SEPARATED FROM THE FUEL RODS

TECHNICAL FIELD

The present invention relates to a fuel assembly with a lower lattice device or element and a plurality of fuel rods supported by said lattice device, a fuel box which surrounds all the fuel rods, and a base with a downwardly-facing inlet opening for reactor coolant, the fuel assembly having at least one vertical by-pass channel for a water flow along but being separated from the fuel rods.

DISCUSSION OF PRIOR ART

More particularly, the invention relates to a a fuel assembly which is constructed in such a way that it is capable of being used, with advantage, in a boiling water reactor which is originally intended for fuel assemblies having no water channel of the kind mentioned above, without it being necessary to introduce any considerable change of the other components of the reactor. A problem, which will then be encountered, is how to achieve a necessary by-pass flow through the central water channel(s) when the reactor power is being reduced by reducing the speed of the circulating pumps. With a fuel assembly according to the invention, an automatic adjustment of the water flow supplied to the above-mentioned vertical water channels takes place in such a manner that the magnitude of this flow is dependent on the magnitude of the power supplied to these water channels.

DISCLOSURE OF THE INVENTION

A fuel assembly according to the invention is intended to be arranged in a reactor core in a conventional manner, with four fuel assemblies in each core module, water gaps between adjacent assemblies, and a control rod of cruciform cross-section in each module. In addition to the flow flowing along the fuel rods and in contact therewith, the reactor core is traversed by a first by-pass flow, which is located at the above-mentioned gaps formed between the fuel assemblies, and by a second by-pass flow which is located at the above-mentioned vertical water channels.

According to the invention, there is provided a fuel assembly having a vertical center line and comprising a lower lattice device and a plurality of vertical fuel rods supported by said lattice device, a fuel box which surrounds all the fuel rods, and a sleeve-like base with a downwardly-facing inlet opening for reactor coolant, the fuel assembly having at least one vertical water channel for a water flow flowing along the fuel rods and being separated therefrom, wherein the at least one vertical water channel is hydraulically connected at its lower end to at least one substantially radially extending channel opening out at the side surface of the fuel assembly, the wall of said base being provided with at least one through-hole, the at least one through-hole being positioned at a lower level than the outlet openings of said substantially radial channels and beng arranged in hydraulic connection with said inlet opening via a space surrounded by said base.

BRIEF DESCRIPTION OF DRAWINGS

An embodiment of a fuel assembly according to the invention will be described in the following with reference to FIGS. 1 to 4 on the accompanying schematic drawings.

DESCRIPTION OF PREFERRED EMBODIMENTS

Figure 1:
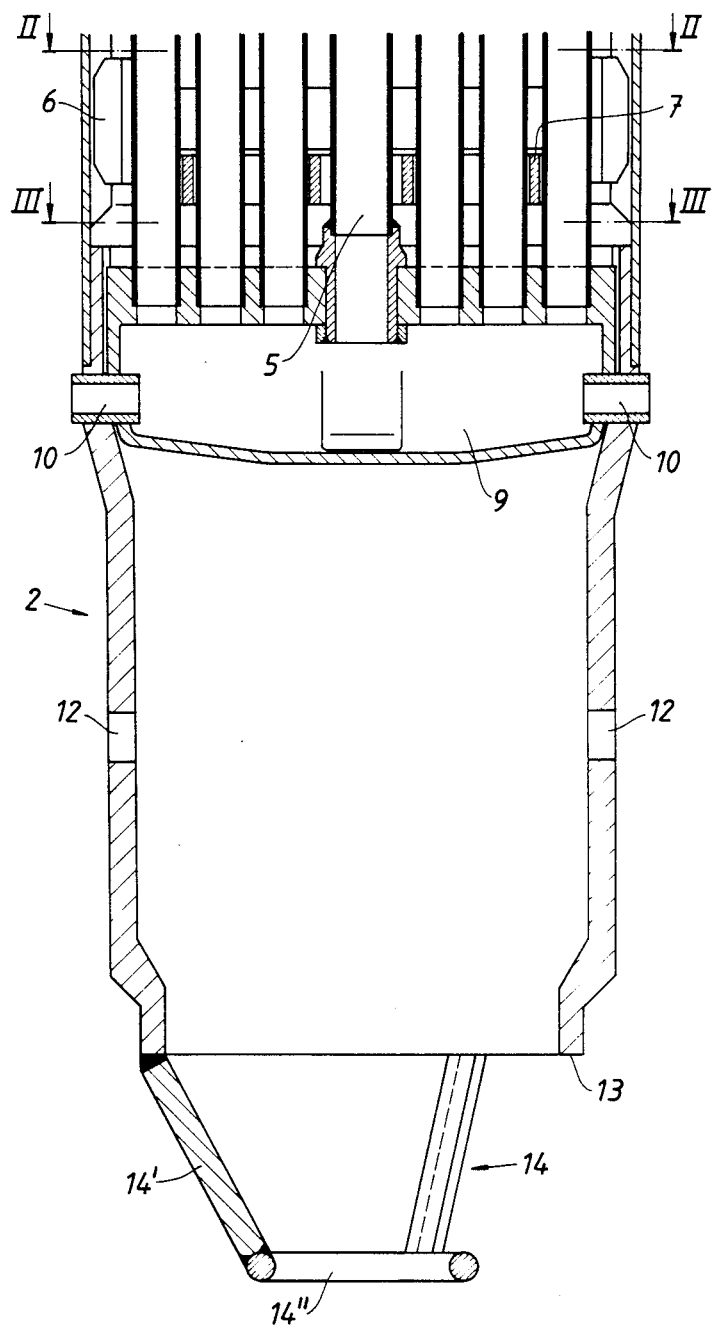
FIG. 1 shows a vertical section taken along line I—I of FIGS. 2 and 3.
Figure 2:
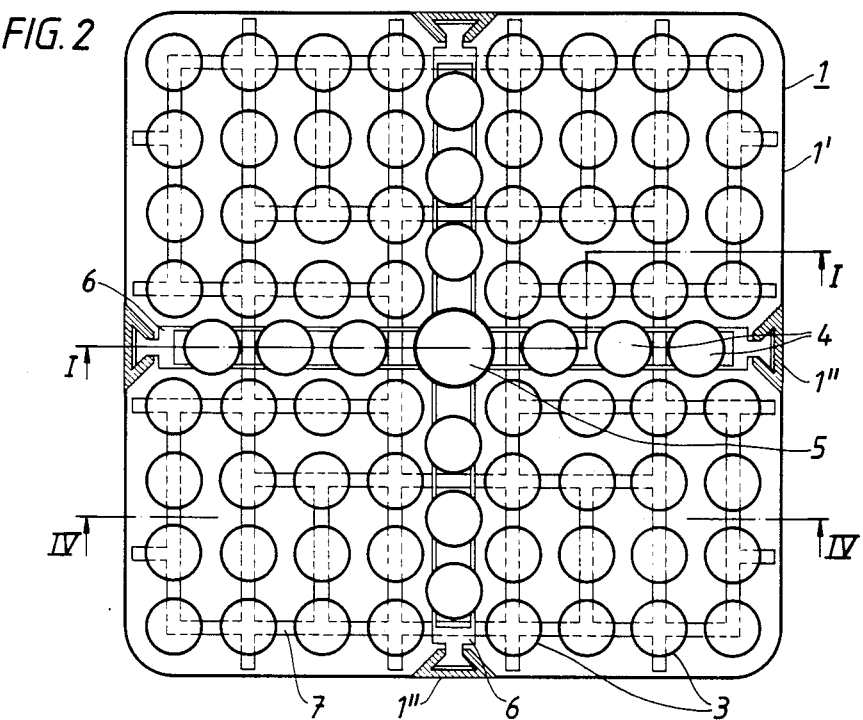
FIGS. 2 and 3 show horizontal sections taken along lines II—II and III—III, respectively, of FIG. 1.
Figure 3:
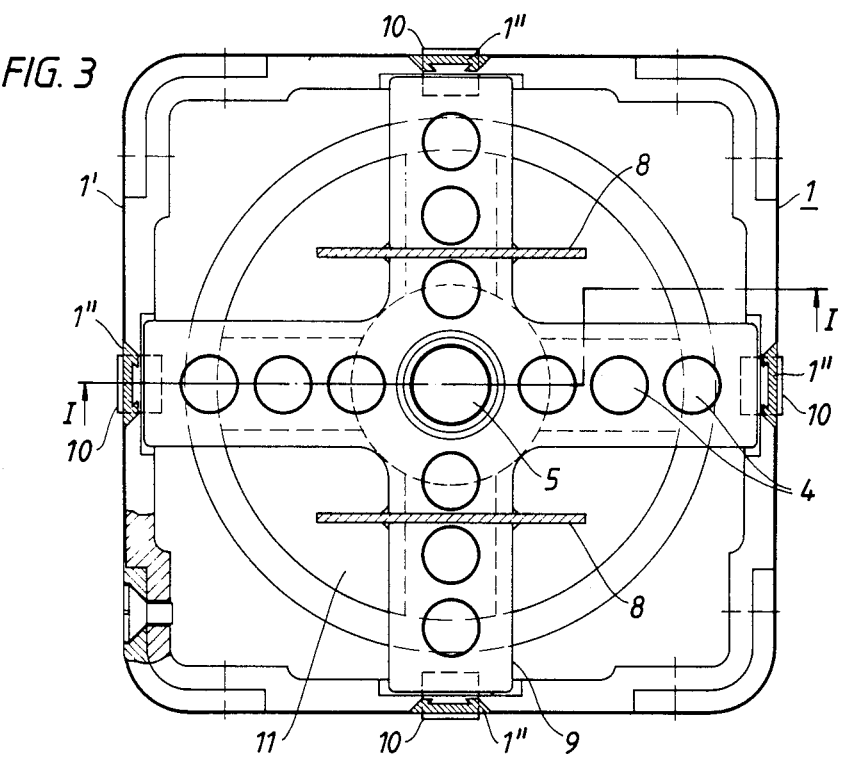
Figure 4:
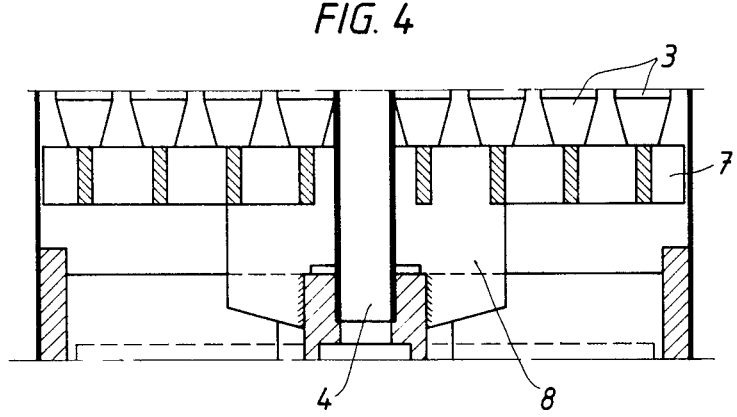
FIG. 4 shows a partial vertical section taken along line IV—IV of FIG. 2.

In FIGS. 1, 2, 3 and 4, the numeral 1 designates a fuel box which is attached to a sleeve-formed base 2. In use of the fuel assembly in a boiling water reactor, the exterior surfaces of the fuel box and the base face the space within the reactor but outside the fuel assembly. The fuel box 1, which is composed of four mutually equal sheet-metal elements 1', interconnected by means of four vertical strips 1", surrounds sixty-four fuel rods 3, twelve smaller water tubes 4 and one larger, central water tube 5. Each water tube forms a vertical channel extending along the fuel rods and conducting a water flow along but being separated from the fuel rods. The water tubes are mechanically connected to each other by means of a plurality of elongated linking members 6, which are attached with their ends to the strips 1". The fuel rods 3 rest with their lower ends on a bottom lattice device or element 7, which rests on two vertical supporting plates 8, which are welded to a hollow, cruciform water distributing member 9, which is provided with connection openings for the water tubes 4 and 5. The connection openings are constructed with annular supporting surfaces, against which the water tubes 4 and 5 rest at their lower end surfaces. The water distributing member 9 is provided with at least one (e.g. four) substantially radial tube 10, which opens out at the side surface of the fuel assembly and through which both the interior cavity of the member 9 and the water tubes 4 and 5 are hydraulically connected to space located radially outside the base 2. The base 2 of the fuel assembly has a circular, downwardly-facing inlet opening positioned below tubes 10, as illustrated. The inlet opening is surrounded by a substantially annular end surface 13. A guide member 14, which consists of a ring 14" and a plurality of rods 14' attached thereto, is arranged below the sleeve-formed base 2. The fuel assembly shown has a vertical center line and is intended to be supported, together with three similar fuel assemblies, by a common supporting plate intended for four fuel assemblies, said supporting plate being constructed with a conical supporting surface and a circular throttling opening for each fuel assembly. Below the radial tubes 10 and below the water distributing member 9, the wall of the base 2 is provided with at least one through-hole 12 which opens out at the side surface of the fuel assembly and opens inwardly directly into the interior of base 2, so that the inlet opening is hydraulically connected to the reactor space located radially outside the base.

When the flow paths of the described fuel assembly are dimensioned in such a way that an optimum by-pass flow through the water tubes 4 and 5 is obtained at full reactor power, it cannot be avoided that a certain amount of boiling takes place in the water tubes 4 and 5 when the reactor power is reduced to a minimum by reducing the speed of the circulating pumps. To a certain extent such boiling gives rise to void formation at the upper part of the water tubes, which results in the pressure being considerably reduced in the water distributor 9, water thus flowing in through the channels 10 from the gaps located between the fuel assemblies. At a fully acceptable value of the void formation, the corresponding increase of the water flow through the radial channels 10 will be so great that a state of equilibrium will be created.

We claim:

1. A fuel assembly for a boiling water reactor, the assembly having a vertical centerline and comprising:

a lower lattice element;

a plurality of vertical fuel rods supported by said lattice element;

a fuel box surrounding said fuel rods, said fuel box having an exterior surface which in use of the fuel assembly faces the space which is within a boiling water reactor but is outside the fuel assembly;

a sleeve-like base with a downwardly facing inlet opening for reactor coolant to be flowed over the surfaces of said fuel rods, said base supporting said fuel box and said lattice element and also having a wall with an exterior surface which in use of the fuel assembly faces the space which is within a boiling water reactor but is outside the fuel assembly;

at least one vertical water channel located within said fuel box for a flow of water along but separated from said fuel rods, said vertical channel having a lower end;

at least one channel positioned above said downward-facing inlet opening, said channel being extended radially relative to said center line and opening at the side surface of the fuel assembly so that in use of the fuel assembly said radially extended channel opens to the space which is within the boiling water but is outside the fuel assembly;

means for hydraulically connecting said at least one radially extended channel to said lower end of said water channel to provide flow from the outside of said fuel assembly, through said radially extended channel and into said water channel, said means for hydraulically connecting comprising a hollow body, said hollow body receiving said flow only from said at least one radially extended channel, said at least one water channel receiving said flow only from said hollow body; and at least one through-hole in said wall of said base, said through-hole opening outward through the side surface of the fuel assembly and being positioned above said inlet opening but below said at least one radially extended channel, said through-hole being hydraulically connected to said inlet opening of said base, whereby in use of the fuel assembly coolant flows to said at least one water channel via said inlet opening, said at least one through-hole, the space which is within a boiling water reactor but is outside the fuel assembly, said at least one radially extended channel, and said menas for hydraulically connecting.

2. A fuel assembly according to claim 1, wherein there are a plurality of vertical water channels comprised of a plurality of vertical water tubes arranged in two rows intersecting at said vertical center line, said water tubes having lower ends; and said hollow body is a cruciform body supported by said base, said lower ends of said water tubes being supported by said hollow cruciform body and said water tubes being hydraulically connected to the interior of said hollow cruciform body, said at least one radially extended channel extending from said hollow cruciform body.

* * * * *